US009942557B2

United States Patent
Carmel et al.

(10) Patent No.: US 9,942,557 B2
(45) Date of Patent: Apr. 10, 2018

(54) METHOD AND SYSTEM OF VIDEO ENCODING OPTIMIZATION

(71) Applicant: BEAMR IMAGING LTD., Tel-Aviv (IL)

(72) Inventors: Sharon Carmel, Ramat Hasharon (IL); Dror Gill, Haifa (IL); Tamar Shoham, Netanya (IL); Dan Julius, Giva'at Ada (IL); Liad Hacmon, Tel-Aviv (IL); Lior Mizrahi, Modiin-Macabim-Reut (IL); Udi Yehuda Shrot, Givat Shmuel (IL); Amir Leibman, Netanya (IL); Alon Biran, Ramat HaSharon (IL); Eyal Enav, Haifa (IL)

(73) Assignee: BEAMR IMAGING LTD., Tel-Aviv (IL)

( * ) Notice: Subject to any disclaimer, the term of this patent is extended or adjusted under 35 U.S.C. 154(b) by 0 days.

(21) Appl. No.: 15/528,473

(22) PCT Filed: Jan. 1, 2017

(86) PCT No.: PCT/IL2017/050002
§ 371 (c)(1),
(2) Date: May 19, 2017

(87) PCT Pub. No.: WO2017/130183
PCT Pub. Date: Aug. 3, 2017

(65) Prior Publication Data
US 2018/0063536 A1    Mar. 1, 2018

Related U.S. Application Data

(60) Provisional application No. 62/287,150, filed on Jan. 26, 2016.

(51) Int. Cl.
*H04B 1/66*     (2006.01)
*H04N 19/189*   (2014.01)
(Continued)

(52) U.S. Cl.
CPC ......... *H04N 19/189* (2014.11); *H04N 19/154* (2014.11); *H04N 19/176* (2014.11);
(Continued)

(58) Field of Classification Search
CPC .... H04N 19/189; H04N 19/82; H04N 19/154; H04N 19/177; H04N 19/176; H04N 19/61; H04N 19/87
(Continued)

(56) References Cited

U.S. PATENT DOCUMENTS

| 8,199,810 B2 | 6/2012 | Mabey et al. |
| 2007/0002946 A1 | 1/2007 | Bouton et al. |

(Continued)

FOREIGN PATENT DOCUMENTS

WO    2015/022685    2/2015

*Primary Examiner* — Dhaval Patel
(74) *Attorney, Agent, or Firm* — Browdy and Neimark, PLLC

(57) ABSTRACT

A computerized method and system of segment-based video encoding optimization, the method comprising obtaining a set of input segments constituting an input video stream; selecting one or more input segments in accordance with a selection criterion to be one or more representative segments; determining an encoding instruction and obtaining one or more encoded representative segments encoded from the representative segments in accordance with the encoding instruction and using a quality-driven video encoding scheme; determining, based on the encoded representative segments, an encoding configuration, and obtaining one or more encoded input segments encoded from at least a sub-set of the input segments using the encoding configuration; determining an evaluation instruction used to evaluate quality for each encoded input segment; and generating an output video stream, by selecting, for each input segment, a corresponding output segment from a group comprising at
(Continued)

least one of the following candidate segments: the input segment, an encoded representative segment, and an encoded input segment.

43 Claims, 4 Drawing Sheets

(51) Int. Cl.
    *H04N 19/176*     (2014.01)
    *H04N 19/177*     (2014.01)
    *H04N 19/154*     (2014.01)
    *H04N 19/82*     (2014.01)
    *H04N 19/87*     (2014.01)
    *H04N 19/61*     (2014.01)

(52) U.S. Cl.
    CPC .......... *H04N 19/177* (2014.11); *H04N 19/82* (2014.11); *H04N 19/61* (2014.11); *H04N 19/87* (2014.11)

(58) Field of Classification Search
    USPC ............ 340/240.01, 240.02, 240.03, 240.08, 340/240.07, 240.26; 709/219, 247
    See application file for complete search history.

(56) References Cited

U.S. PATENT DOCUMENTS

| | | | |
|---|---|---|---|
| 2007/0140335 A1* | 6/2007 | Wilinski | H04N 19/159 375/240.08 |
| 2013/0223510 A1 | 8/2013 | Coudurier et al. | |
| 2014/0019593 A1* | 1/2014 | Reznik | H04L 65/60 709/219 |
| 2014/0149557 A1* | 5/2014 | Lohmar | H04L 65/605 709/219 |
| 2014/0211859 A1 | 7/2014 | Carmel et al. | |
| 2015/0023404 A1* | 1/2015 | Li | H04L 65/4084 375/240.02 |

* cited by examiner

METHOD AND SYSTEM OF VIDEO ENCODING OPTIMIZATION

TECHNICAL FIELD

The presently disclosed subject matter relates, in general, to the field of video encoding systems, and, more particularly, to video encoding configuration and optimization.

BACKGROUND

Nowadays, with the fast development of imaging and video technologies, video plays a key role as a mechanism of information exchange, transmission or storage. Video encoding has been deployed in many applications and equipment, ranging from digital cinema, mobile handsets, cable and satellite digital video transmissions, to machine vision and recognition systems, etc. With the proliferation of viewing platforms, file formats and streaming technologies competing in today's online media ecosystem, video encoding is becoming increasingly complicated and cumbersome. Optimal encoding and re-encoding of video content, such as, e.g., video compression and recompression, remains as a longstanding challenge in the field.

Given a particular video encoder, the goal of video encoding is often to create an encoded video which has maximal quality and best user experience, given a set of limited resources such as total bandwidth, computation power etc. Some of the currently available video encoders may focus on encoding at a certain bit-rate without considering the encoded video quality, whereas some others may target at achieving a given quality criterion while neglecting time and bit consumption of such encoding. It is widely acknowledged that a large part of the challenge consists in reliably and automatically determining the subjective quality of a candidate video clip, or of being able to obtain minimal bit-rate for a desired target quality, on a per clip or per title basis. It is challenging and complex to provide an optimal video encoding solution that is both efficient and cost-effective.

GENERAL DESCRIPTION

In accordance with certain aspects of the presently disclosed subject matter, there is provided a computerized method of segment-based video encoding optimization, the method comprising: obtaining a set of input segments constituting an input video stream, each input segment corresponding to a plurality of video frames; selecting one or more input segments from the set of input segments in accordance with a selection criterion, giving rise to one or more representative segments; determining an encoding instruction and obtaining one or more encoded representative segments encoded from the representative segments in accordance with the encoding instruction and using a quality-driven video encoding scheme; determining, based on the encoded representative segments, an encoding configuration, and obtaining one or more encoded input segments encoded from at least a sub-set of the input segments using the encoding configuration; determining an evaluation instruction used to evaluate quality for each encoded input segment; and based on at least the evaluated quality for each encoded input segment, generating an output video stream, by selecting, for each input segment, a corresponding output segment from a group comprising at least one of the following candidate segments: the input segment, an encoded representative segment of the input segment, and an encoded input segment of the input segment.

In accordance with other aspects of the presently disclosed subject matter, there is provided a computerized system of segment-based video encoding optimization, the system comprising: an I/O interface configured to obtain a set of input segments constituting an input video stream, each input segment corresponding to a plurality of video frames; and a processing device comprising a processor and a memory operatively coupled therewith, the processing device configured to: select one or more input segments from the set of input segments in accordance with a selection criterion, giving rise to one or more representative segments; determine an encoding instruction and obtain one or more encoded representative segments encoded from the representative segments in accordance with the encoding instruction and using a quality-driven video encoding scheme; determine, based on the encoded representative segments, an encoding configuration and obtain one or more encoded input segments encoded from at least a sub-set of the input segments using the encoding configuration; determine an evaluation instruction used to evaluate quality for each encoded input segment; and based on at least the evaluated quality for each encoded input segment, generate an output video stream, by selecting, for each input segment, a corresponding output segment from a group comprising at least one of the following candidate segments: the input segment, an encoded representative segment of the input segment, and an encoded input segment of the input segment.

In accordance with other aspects of the presently disclosed subject matter, there is provided a non-transitory computer readable storage medium tangibly embodying a program of instructions executable by a processing device comprised in a computer to perform a method of segment-based video encoding optimization, the method comprising the steps of the following: obtaining a set of input segments constituting an input video stream, each input segment corresponding to a plurality of video frames; selecting one or more input segments from the set of input segments in accordance with a selection criterion, giving rise to one or more representative segments; determining an encoding instruction and obtaining one or more encoded representative segments encoded from the representative segments in accordance with the encoding instruction and using a quality-driven video encoding scheme; determining, based on the encoded representative segments, an encoding configuration, and obtaining one or more encoded input segments encoded from at least a sub-set of the input segments using the encoding configuration; determining an evaluation instruction used to evaluate quality for each encoded input segment; and based on at least the evaluated quality for each encoded input segment, generating an output video stream, by selecting, for each input segment, a corresponding output segment from a group comprising at least one of the following candidate segments: the input segment, an encoded representative segment of the input segment, and an encoded input segment of the input segment.

In accordance with further aspects of the presently disclosed subject matter, and optionally, in combination with any of the above aspects, the method or the system can comprise one or more of the features listed below, in any desired combination or permutation which is technically possible:

The input video stream can be split into the set of input segments in accordance with a splitting criterion. The splitting criterion can include that each input segment other than a last input segment has a minimum segment length. The splitting criterion can include that the splitting is performed at locations within the input stream such that decoding of each encoded input segment are conducted independently from one other. The splitting criterion can include that the splitting is performed in accordance with content of the input video stream. The splitting can be performed at locations within the input video stream indicative of scene changes such that different input segments represent different scenes. The splitting can be performed such that each input segment includes one or more of a Group Of Pictures (GOP). The selection criterion can include selecting a predetermined percentage of the input segments as the representative segments. The selection criterion can include selecting one or more input segments with a bit-rate that is representative of a bit-rate of the input video stream. The selection criterion can include selecting one or more input segments representing different scene types in the input video stream.

In accordance with further aspects of the presently disclosed subject matter, and optionally, in combination with any of the above aspects, the method or the system can further comprise one or more of the features listed below, in any desired combination or permutation which is technically possible:

The quality-driven video encoding scheme can include encoding each video frame of the representative segments until a quality criterion is met by a corresponding encoded frame of the encoded representative segments. The quality-driven video encoding scheme can include: for each video frame of the representative segments, encoding the video frame with a compression parameter; computing a frame quality score for the encoded frame; and in case the quality criterion is not met by the frame quality score, repeating the encoding with an updated compression parameter giving rise to an updated encoded frame, and repeating the computing for the updated encoded frame, until a frame quality score of the updated encoded frame meets the quality criterion. In some cases, the quality-driven video encoding scheme can include: for each GOP of the representative segments, each video frame within the GOP can be encoded with a compression parameter, and the corresponding encoded video frames can constitute an encoded GOP. A GOP quality score can be computed for the encoded GOP. For instance, the GOP quality score is computed based on at least one frame quality score calculated for at least one encoded frame within the encoded GOP. In cases where a quality criterion (e.g., in this case the quality criterion is a GOP level quality criterion) is not met by the GOP quality score, the encoding of each video frame within the GOP can be repeated with an updated compression parameter, giving rise to an updated encoded GOP. The computation of the GOP quality score can also be repeated for the updated encoded GOP, until a GOP quality score of the updated encoded GOP meets the quality criterion.

The computing of a frame quality score can be based on an intra-frame quality score and an inter-frame quality score. The intra-frame quality score can be computed using an intra-frame quality applied in the pixel-domain of the video frame and the encoded frame. The inter-frame quality score can be computed based on a first difference between the video frame and a preceding video frame, and a second difference between the encoded frame and a preceding encoded frame.

In accordance with further aspects of the presently disclosed subject matter, and optionally, in combination with any of the above aspects, the method or the system can further comprise one or more of the features listed below, in any desired combination or permutation which is technically possible:

The encoding configuration can include setting a target bit-rate for encoding at least a sub-set of the input segments based on an average bit-rate of the encoded representative segments. The encoding configuration can include setting a target bit-rate for encoding at least a sub-set of the input segments based on a bit-rate of the input video stream and a relation between a bit-rate of the representative segments and a bit-rate of the corresponding encoded representative segments. The encoding configuration can include setting a target bit-rate for encoding at least a sub-set of the input segments based on a bit-rate of the input video stream and a minimal reduction ratio, the minimal reduction ratio being determined based on the encoded representative segments. The encoding configuration can further include configuring one or more encoding properties based on information acquired during the encoding of the representative segments using the quality-driven video encoding scheme. The configuring one or more encoding properties can include adapting an encoding parameter that configures an in-loop de-blocking filter in case of the encoding of the representative segments indicating presence of blockiness in the input video stream. The sub-set of the input segments can include a remaining set of the input segments which are not included in the representative segments.

In accordance with further aspects of the presently disclosed subject matter, and optionally, in combination with any of the appropriate above aspects, the method or the system can further comprise one or more of the features listed below, in any desired combination or permutation which is technically possible:

The determining an encoding configuration can include determining different encoding configurations for encoding respective input segments representing different scenes. The quality can be evaluated using a perceptual quality measure, including: computing a segment quality score for each encoded input segment, and determining if a segment quality criterion is met by the segment quality score. The segment quality score can be computed based on at least one frame quality score calculated for at least one encoded frame within the encoded input segment. A re-encoded version of an input segment corresponding to an encoded input segment that meets a predetermined condition can be obtained. The predetermined condition can include: the segment quality criterion is not met by the segment quality score of an encoded input segment, and the bit-rate of the encoded input segment is substantially reduced compared to the bit-rate of the corresponding input segment; and wherein the re-encoded version of the input segment can be obtained in accordance with a different encoding configuration including one of the following: re-encoding with a higher target bit-rate, and re-encoding with the quality-driven video encoding scheme. The predetermined condition can include: the segment quality score is substantially higher than the segment quality criterion; and wherein the re-encoded version of the input segment is obtained in accordance with a different encoding configuration including one of the following: re-encoding with a lower target bit-rate, and re-encoding with the quality-driven video encoding scheme.

In accordance with further aspects of the presently disclosed subject matter, and optionally, in combination with any of the appropriate above aspects, the method or the system further can comprise one or more of the features listed below, in any desired combination or permutation which is technically possible:

The selecting a corresponding output segment can include for each input segment, selecting a candidate segment with a lowest bit-rate from the group which meets the segment quality criterion, to be the corresponding output segment. The selecting of an input segment can depend on a selection made for other input segments. A preliminary encoding of the input video stream can be performed in accordance with a predetermined bit-rate giving rise to a preliminary encoded input stream, and wherein the set of input segments are derived from the preliminary encoded input stream. The group can further include an input segment derived from the preliminary encoded input stream. The encoding can relate to compression or re-compression. The method can further comprise: encoding the representative segments in accordance with the encoding instruction using a quality-driven video encoding scheme, giving rise to the one or more encoded representative segments. The method can further comprise: encoding at least a sub-set of the input segments in accordance with the encoding configuration, giving rise to the one or more encoded input segments. The method can further comprise evaluating quality for each encoded input segment in accordance with the evaluation instruction. The method can further comprise: re-encoding an input segment corresponding to an encoded input segment that meets a predetermined condition. The input video stream can comprise an input video bit-stream with each input segment thereof corresponding to a plurality of encoded video frames. The input video stream can comprise an original input video sequence with each input segment thereof corresponding to a plurality of original video frames.

In accordance with other aspects of the presently disclosed subject matter, there is provided a computerized system of segment-based video encoding optimization, the system comprising an I/O interface and a processing device that comprises a processor and a memory operatively coupled therewith, the system configured to perform the method steps of any one of the above mentioned methods.

In accordance with other aspects of the presently disclosed subject matter, there is provided a non-transitory computer readable storage medium tangibly embodying a program of instructions executable by a processing device comprised in a computer to perform the method steps of any one of the above mentioned methods.

BRIEF DESCRIPTION OF THE DRAWINGS

In order to understand the presently disclosed subject matter and to see how it may be carried out in practice, the subject matter will now be described, by way of non-limiting example only, with reference to the accompanying drawings, in which.

DETAILED DESCRIPTION

Figure 1:
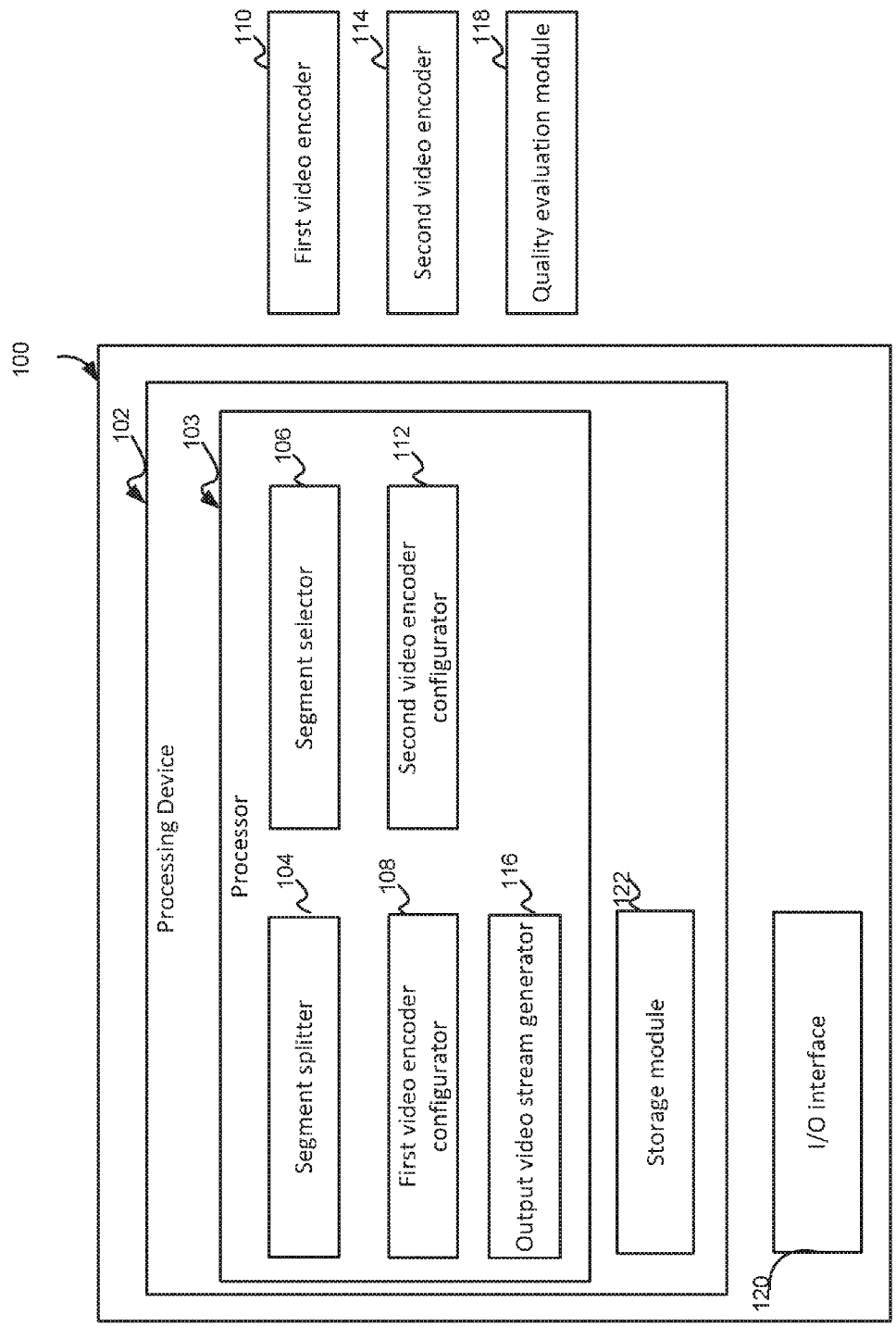
FIG. 1 is a functional block diagram schematically illustrating a computerized system of segment-based video encoding optimization in accordance with certain embodiments of the presently disclosed subject matter.

In the following detailed description, numerous specific details are set forth in order to provide a thorough understanding of the disclosed subject matter. However, it will be understood by those skilled in the art that the present disclosed subject matter can be practiced without these specific details. In other instances, well-known methods, procedures, and components have not been described in detail so as not to obscure the present disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "selecting", "determining", "instructing", "providing", "generating", "splitting", "encoding", "computing", "repeating", "setting", "configuring", "re-encoding", "performing", "evaluating", or the like, include action and/or processes of a computer that manipulate and/or transform data into other data, said data represented as physical quantities, e.g. such as electronic quantities, and/or said data representing the physical objects. The term "computer" should be expansively construed to cover any kind of hardware-based electronic device with data processing capabilities, including, by way of non-limiting example, a personal computer, a server, a computing system, a communication device, any other electronic computing device, and or any combination thereof, such as, e.g., the computerized system of segment-based video encoding optimization disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory" and "non-transitory storage medium" as used herein should be expansively construed to cover any volatile or non-volatile computer memory suitable to the presently disclosed subject matter.

It is also to be understood that the term "signal" used herein excludes transitory propagating signals, but includes any other signal suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination.

In embodiments of the presently disclosed subject matter one or more stages illustrated in the figures may be executed in a different order and/or one or more groups of stages may be executed simultaneously and vice versa.

Bearing this in mind, attention is now drawn to FIG. 1, schematically illustrating a functional block diagram of a system for segment-based video encoding optimization in accordance with certain embodiments of the presently disclosed subject matter.

According to certain embodiments, there is provided a system 100 for segment-based video encoding optimization. The term "video encoding" used in this patent specification should be expansively construed to cover any kind of video compression that converts raw (uncompressed) digital video to a compressed format, as well as video recompression that converts decoded or decompressed video to a re-encoded or recompressed format. The system 100 can comprise a processing device 102 operatively coupled to an I/O interface 120. The processing device 102 is a hardware based device which comprises a processor 103 and a storage module 122 operatively coupled thereto. The term "processor" used herein refers to hardware (e.g., an electronic circuit) within a computer that executes a program. By way of non-limiting example, a processor can be any one of the following: digital signal processor (DSP), a microcontroller, a field programmable gate array (FPGA), an application specific integrated circuit (ASIC), etc. The I/O interface 120 can be hardware based. The processor 103 can include a segment selector 106, a first video encoder configurator 108, a second video encoder configurator 112, and an output video stream generator 116. In some cases, the processor 103 can further include a segment splitter 104. According to certain embodiments, the system 100 can be operatively connected to one or more of the following: a first video encoder 110, a second video encoder 114 and a quality evaluation module 118, for controlling and configuring such functional modules, and these functional modules can in turn provide encoding and evaluation feedback to the system 100 for facilitating the optimization of the video encoding process. Alternatively, one or more of the functional modules of 110, 114 and 118 can be included in the processor of the processing device as part of the system 100, as will be described in detail below.

The processing device 102 can be configured to execute functionalities of functional modules 106, 108, 112, 116 and possibly also one or more of 110, 114 and 118, in accordance with computer-readable instructions implemented on a non-transitory computer readable storage medium, which may be included in storage module 122. The above mentioned functional modules are referred to herein as comprised in the processor.

The system 100 may obtain, through an I/O interface 120, a set of input segments constituting an input video stream, each input segment corresponding to a plurality of video frames as comprised in the input video stream.

In some embodiments, the set of input segments can be obtained by receiving them from a user, a third party provider or any other system that has processed the input video stream into the format of segments. Optionally, the processor 103 can further comprise a segment splitter 104 configured to split the input video stream into the set of input segments in accordance with a splitting criterion, as will be described in further detail with reference to FIG. 2.

The segment selector 106 can be configured to select one or more input segments from the set of input segments in accordance with a selection criterion, giving rise to one or more representative segments.

The processing device 102, or the processor 103, can be configured to determine an encoding instruction and obtain one or more encoded representative segments encoded from the representative segments in accordance with the encoding instruction and using a quality-driven video encoding scheme. According to certain embodiments, a first video encoder 110 can encode the representative segments in accordance with the encoding instruction and using a quality-driven video encoding scheme. In certain embodiments, the first video encoder 110 can be implemented in a standalone computer that is operatively connected with the system 100. The first video encoder configurator 108 as comprised in processor 103 can be configured to determine an encoding instruction and provide the encoding instruction to the first video encoder 110 for encoding the representative segments using a quality-driven video encoding scheme, giving rise to one or more encoded representative segments. The first video encoder 110 can be configured to receive an encoding instruction from the first video encoder configurator 108, encode the representative segments to the encoded representative segments and provide the encoded representative segments as feedback to system 100. Alternatively, the functionality of the first video encoder 110, or at least part thereof, can be integrated within the system 100. By way of example, the processor 103 of system 100 can further comprise the first video encoder 110, and accordingly, upon the encoding instruction being determined, the processor 103, specifically the first video encoder 110 comprised therein, can be further configured to obtain one or more encoded representative segments by encoding the representative segments in accordance with the encoding instruction and using a quality-driven video encoding scheme.

The processing device 102, or the processor 103, can be configured to determine, based on the encoded representative segments, an encoding configuration, and obtain one or more encoded input segments encoded from at least a sub-set of the input segments using the encoding configuration. According to certain embodiments, a second video encoder 114 can encode at least a sub-set of the input segments using the encoding configuration. In certain embodiments, the second video encoder 114 can be implemented in a standalone computer that is operatively connected with the system 100. The second video encoder configurator 112 as comprised in processor 103 can be configured to determine, based on the encoded representative segments, an encoding configuration, and provide the encoding configuration to a second video encoder 114 for encoding at least a sub-set of the input segments, giving rise to one or more encoded input segments. The second video encoder 114 can be configured to receive an encoding configuration from the second video encoder configurator 112, encode at least the sub-set of the input segments to the encoded input segments and provide the encoded input segments as feedback to system 100. Alternatively, the functionality of the second video encoder 114, or at least part thereof, can be integrated within the system 100. By way of example, the processor 103 of system 100 can further comprise the second video encoder 114, and accordingly, upon the encoding configuration being determined, the processor 103, specifically the second video encoder 114 comprised therein, can be further configured to obtain one or more encoded input segments by encoding at least the sub-set of the input segments using the encoding configuration.

The processing device 102 or the processor 103 can be further configured to determine an evaluation instruction used to evaluate quality for each encoded input segment. In certain embodiments, a quality evaluation module 118 that evaluates quality for the encoded input segments can be implemented in a standalone computer that is operatively connected with the system 100. Thus the processor 103 can be configured, through the I/O interface 120, to provide the evaluation instruction to the quality evaluation module 118 to evaluate quality for each encoded input segment. According to certain embodiments, the evaluation instruction can be determined by the processor 103 or a quality evaluation controller of the processor 103 (not illustrated in FIG. 1) in order to be used to evaluate quality for each encoded input segment (e.g., used by the quality evaluation module 118). The quality evaluation module 118 can be configured to receive an evaluation instruction from the I/O interface 120 of system 100, evaluate quality for each encoded input segment, and provide the evaluated quality of each encoded input segment as feedback to system 100. Alternatively, the functionality of the quality evaluation module 118, or at least part thereof, can be integrated within the system 100. By way of example, the processor 103 of system 100 can further comprise the quality evaluation module 118, and accordingly, upon the evaluation instruction being determined, the processor 103, specifically the quality evaluation module 118 comprised therein, can be further configured to use the evaluation instruction to evaluate quality for each encoded input segment.

The output video stream generator 116 can be configured to generate, based on at least the evaluated quality for each encoded input segment, an output video stream, by selecting, for each input segment, a corresponding output segment from a group comprising at least one of the following candidate segments: the input segment, an encoded representative segment of the input segment, and an encoded input segment of the input segment.

As aforementioned, in certain embodiments, the system 100 can further comprise one or more of the functional modules of 110, 114 and 118 whose functionalities can be integrated within the processor 103 of processing device 102. In cases where system 100 comprises all three of functional modules 110, 114 and 118, system 100 is in fact a consolidated video encoding system which receives the input segments of an input video stream, performs segment selection, first video encoding according to a determined encoding instruction, second video encoding according to a determined encoding configuration, performs quality evaluation, and then generates an output video stream which is an optimized encoded video stream.

According to certain embodiments, the system 100 can further comprise an I/O interface 120 and a storage module 122 operatively coupled to the other functional components described above. According to certain embodiments, the I/O interface 120 can be hardware based. The I/O interface 120 can be configured to obtain a set of input segments constituting an input video stream, and in response to the generation of an output video stream by the output video stream generator 116, provide the output video stream to the user. In some embodiments, the I/O interface 120 can also be configured to provide an encoding instruction to a first video encoder 110 and obtain the encoded representative segments therefrom. In some further embodiments, additionally or alternatively, the I/O interface 120 can be configured to provide an encoding configuration to a second video encoder 114 and obtain the encoded input segments therefrom. In yet further embodiments, additionally or alternatively, the I/O interface 120 can be configured to provide an evaluation instruction to the quality evaluation module 118 and obtain evaluated quality of each encoded input segment therefrom.

The storage module 120 comprises a non-transitory computer readable storage medium. For instance, the storage module can include a buffer that holds a set of input segments and/or an input video stream as well as an output video stream. In another example, the buffer may also hold one or more of the intermediate results including: the representative segments, encoded representative segments, encoded input segments, encoding instruction, and encoding configuration, etc. According to certain embodiments, the storage module 120 can also comprise computer-readable instructions embodied therein to be executed by the processing device 102 for implementing the process of video encoding optimization as described below with reference to FIG. 2.

Those versed in the art will readily appreciate that the teachings of the presently disclosed subject matter are not bound by the system illustrated in FIG. 1 and the above exemplified implementations. Equivalent and/or modified functionality can be consolidated or divided in another manner and can be implemented in any appropriate combination of software, firmware and hardware. The system in FIG. 1 can be a standalone network entity, or integrated, fully or partly, with other network entities. Those skilled in the art will also readily appreciate that the data repositories or storage module therein can be shared with other systems or be provided by other systems, including third party equipment.

Figure 2:
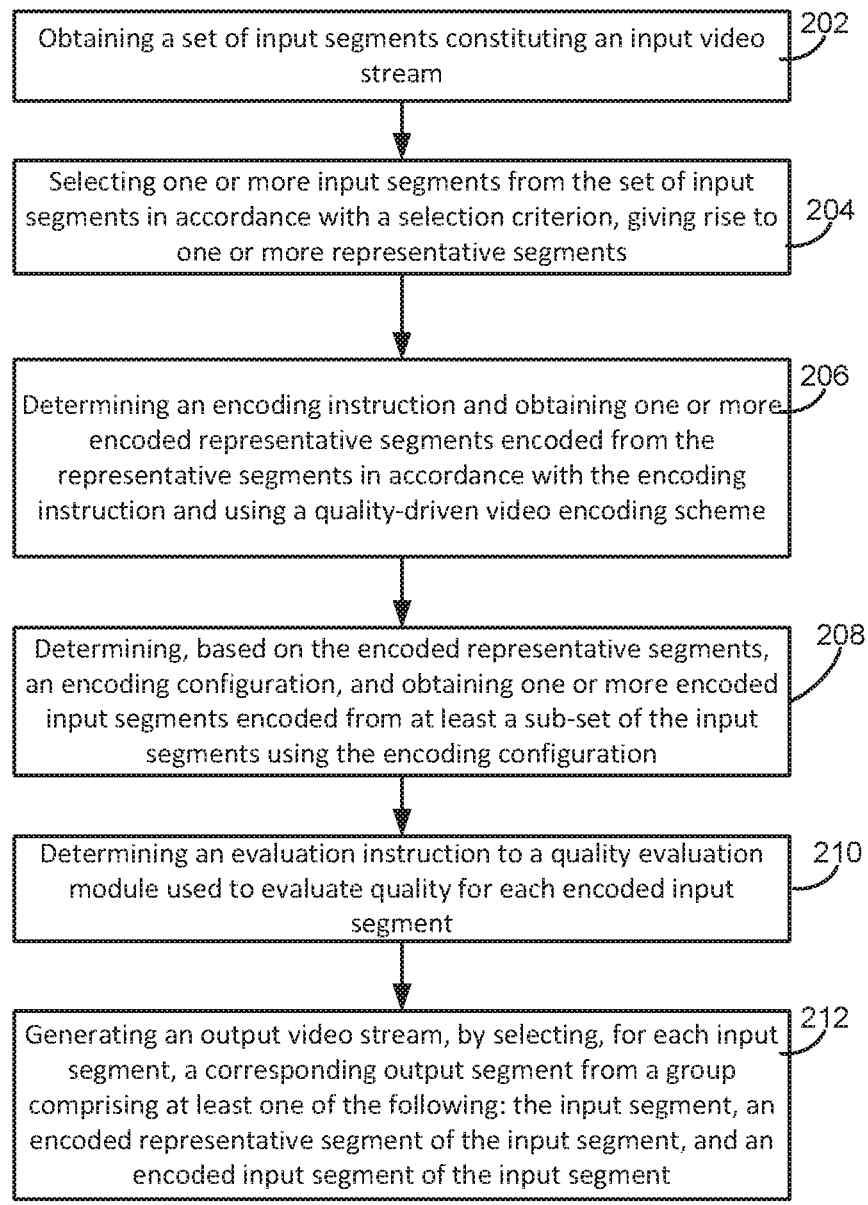
FIG. 2 is a generalized flowchart of segment-based video encoding optimization in accordance with certain embodiments of the presently disclosed subject matter.
Figure 3:
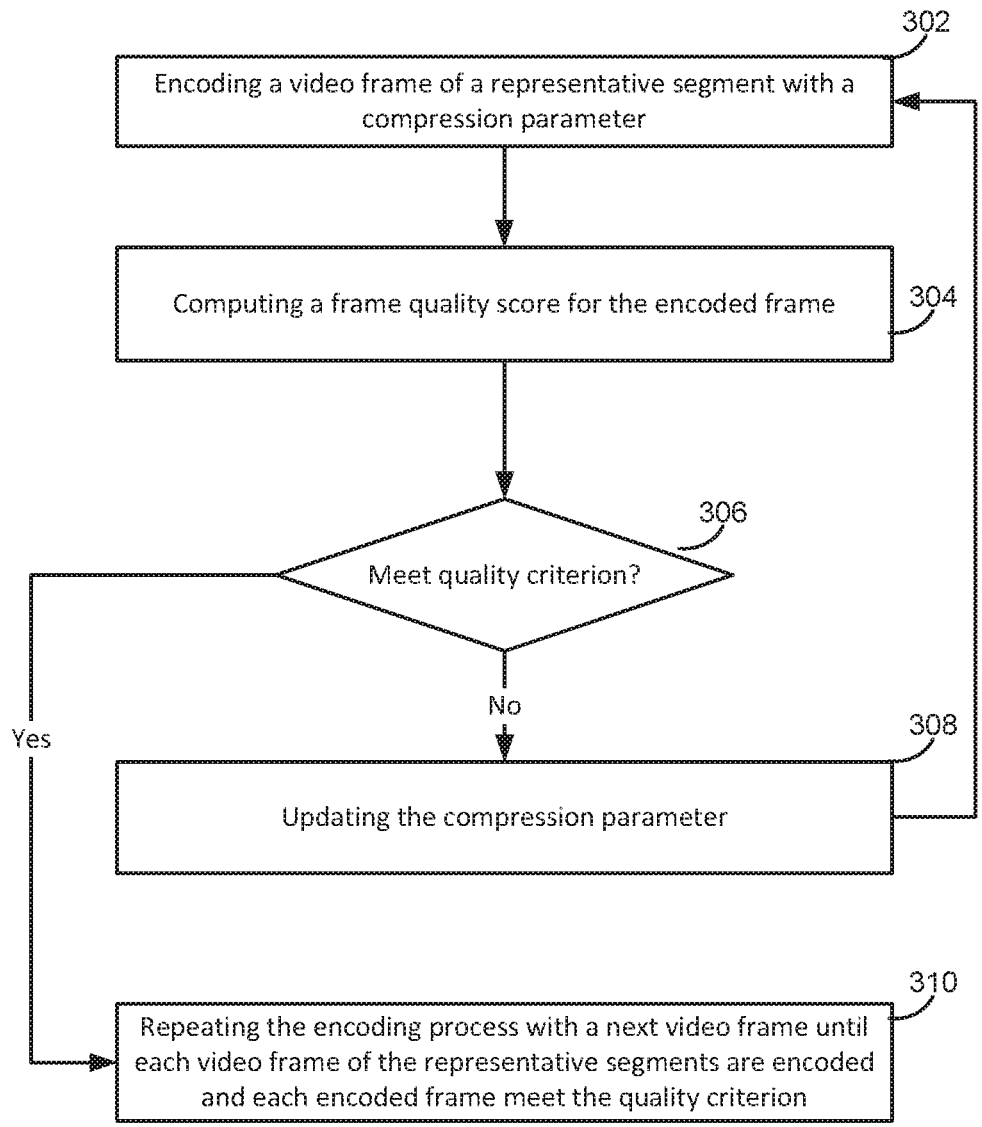
FIG. 3 is a generalized flowchart of video encoding in accordance with a quality-driven video encoding scheme in accordance with certain embodiments of the presently disclosed subject matter.
Figure 4:
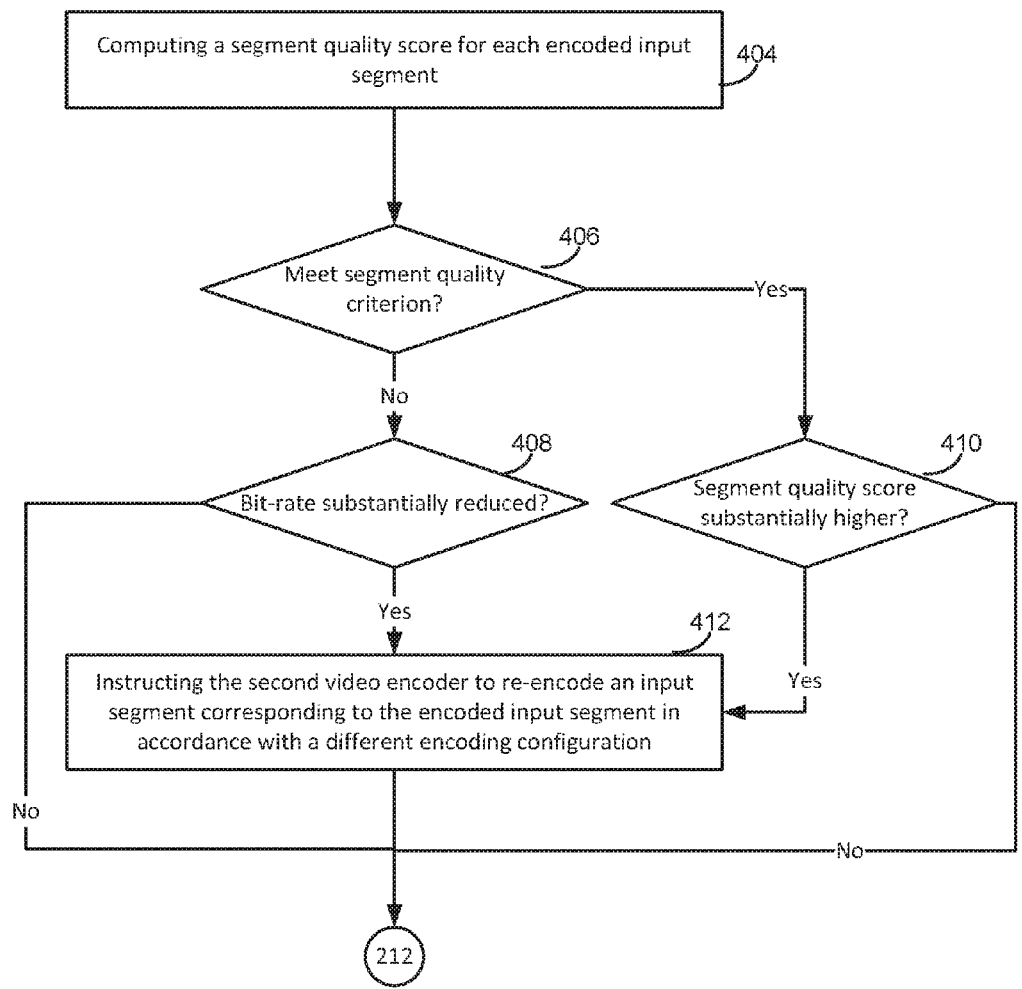
FIG. 4 is a generalized flowchart of quality evaluation and a further encoding process in accordance with certain embodiments of the presently disclosed subject matter.

While not necessarily so, the process of operation of system 100 can correspond to some or all of the stages of the methods described with respect to FIGS. 2-4. Likewise, the methods described with respect to FIGS. 2-4 and their possible implementations can be implemented by system 100. It is therefore noted that embodiments discussed in relation to the methods described with respect to FIGS. 2-4 can also be implemented, mutatis mutandis as various embodiments of the system 100, and vice versa.

Turning now to FIG. 2, there is shown a generalized flowchart of segment-based video encoding optimization in accordance with certain embodiments of the presently disclosed subject matter.

A set of input segments constituting an input video stream can be obtained (202) (e.g., by the I/O interface 120 illustrated in FIG. 1), and each input segment corresponds to a plurality of video frames. It is to be noted that in some cases, the input video stream can comprise an input video bit-stream and each input segment thereof relates to a section of the input video bit-stream which corresponds to a plurality of encoded video frames. Such input video bit-stream has been previously encoded using a video encoder (thus it can also be referred to as "encoded video bit-stream") and includes encoded data pertaining to one or more encoded frames. In some other cases, the input video stream can comprise an original input video sequence and each input segment corresponds to, or comprises, a plurality of original video frames present in the input video sequence. The term "original input video sequence" is used herein to relate to a video sequence that is not encoded. By way of example, such a video sequence can be an original raw video clip captured by a video capturing device such as, e.g., a camera, or alternatively it can be a decoded video sequence which has been decoded from an encoded video bit-stream. Without limiting the scope of the disclosure in any way, it should be noted that the term "frame" used in the specification should be expansively construed to include a single video picture, frame, image, field, or slice of the input video stream.

As aforementioned, in certain embodiments, the set of input segments can be obtained by receiving such (e.g., through the I/O interface 120) from a user, a third party provider or any other system that has processed the input video stream into the format of segments. In some other embodiments, the set of input segments can be obtained by splitting (e.g., by a segment splitter 104 of the processor 103) the input video stream into segments in accordance with a splitting criterion. The splitting criterion can employ one or more of the following considerations. According to certain embodiments, the splitting criterion can include that each input segment other than a last input segment has a minimum segment length, such that each input segment is long enough to justify its management overhead. For instance, each input segment can be set to correspond to at least N frames (e.g., N equals 30).

According to certain embodiments, the splitting criterion can include that the splitting is performed at locations within the input video stream such that decoding of each encoded input segment is conducted independently from one another. In other words, the splitting is performed at locations that enable the selected output segments corresponding to the set of input segments to be stitched together in order to form the output video stream. This can be particularly relevant when the input video stream is referred to in the context of an input video bit-stream and each input segment thereof relates to a section of the input video bit-stream which corresponds to a plurality of encoded video frames. Such input segments can be decoded without requiring any additional information from other segments or any additional information corresponding to encoded video frames that are not contained within this segment. A Group of Pictures ("GOP") is an example of such an input segment that is used in some video coding formats, such as, e.g., MPEG-2, H.263, MPEG-4 parts 2 and 10, H.264 and HEVC, where only reference frames within the GOP are used for encoding. Such a GOP is sometimes referred to as a "closed GOP". In some embodiments, an input segment can include one or more GOPs.

A GOP can include one or more independently decodable video frames, which do not require any additional frames for decoding as they do not use reference frames in their coding process. This frame type is sometimes referred to as an "I-picture" (intra-coded picture) or an "I-frame". Typically, a GOP begins with an I-frame. Further by way of example, other types of frames which may be included in a GOP are: P-picture (predictive coded picture) or P-frame, which contains motion-compensated difference information from previously encoded I-frame(s) or P-frame(s); B-picture (bi-directionally predictive coded picture) or B-frame, which contains difference information from previously encoded I, P or B frames. Note that the encoding order may differ from the display or temporal order of the frames, so that for instance a B-frame may use "future" frames as references for the differential coding. For a GOP to be an input segment, all frames used as references for differential coding must be contained within the GOP. For instance, in an H.264, MPEG-4 part 10 (also referred to as Advanced video coding (AVC)), H.265 or HEVC video stream, splitting to input segments can be achieved by starting each input segment with an Instantaneous Data Refresh ("IDR") frame.

According to certain embodiments, the splitting criterion can include that the splitting is performed in accordance with content of the input video stream. By way of example, the splitting can be performed at locations within the input video stream indicative of scene changes, such that different input segments represent different scenes. For instance, the splitting can be performed such that a first input segment can comprise one or more frames or a section of input bit-stream representing an outdoor scene which contains relatively bright or well illuminated content, and a second input segment subsequent to the first one can comprise one or more frames or a section of input bit-stream representing an indoor scene which has relatively dark, or low light content. By way of another example, the splitting can be performed such that each input segment includes one or more GOPs. The one or more GOPs that constitute an input segment can be consecutive GOPs, or alternatively, they can be non-consecutive GOPs.

According to certain embodiments, in cases where the input video stream is an original raw (uncompressed) video clip, or a very high bit-rate or high quality stream, a preliminary encoding of the input video stream can be performed in accordance with a pre-determined bit-rate or quality level giving rise to a preliminary encoded input stream, and the set of input segments are derived from the preliminary encoded input stream rather than from the original input video stream. For instance, the splitting of the input video stream into the set of input segments will then be performed on the preliminary encoded input stream.

Those versed in the art will readily appreciate that the examples illustrated with reference to the splitting criterion are by no means inclusive of all possible alternatives but are intended to illustrate non-limiting examples, and accordingly other ways of splitting into segments can be used in addition to or in lieu of the above. It is also to be noted that different splitting criteria as described above can be consolidated or divided in different manners. For instance, the splitting can be performed such that an input segment corresponds to at least N frames and starts with an I-frame.

Continuing with the description of FIG. 2, one or more input segments can be selected (204) (e.g., by the segment selector 106 illustrated in FIG. 1) from the set of input segments in accordance with a selection criterion, giving rise to one or more representative segments.

One of the purposes to select the representative segments is that the first video encoding (e.g., by a first video encoder 110) which complies with a quality-driven video encoding scheme can be performed only on the representative segments in order to quickly and efficiently find an encoding configuration for optimizing the encoding of the entire input video stream. Therefore it is important to select segments that are indeed representative of the whole set of input segments in order to obtain a reliable indicator for the encoding configuration.

According to certain embodiments, the selection criterion can include selecting a predetermined percentage of the input segments as the representative segments. For instance, the representative segments can be selected by sampling a certain percentage (e.g., n %) of the input segments. This can be realized, e.g., by selecting x frames from every $100/(x*n)$ frames, or alternatively, by selecting x GOPs in every $100/(x*n)$ GOPs. In some other embodiments, the selection criterion can include selecting one or more input segments with a bit-rate that is representative of a bit-rate of the input video stream to be the representative segments. By way of example, the input segments that have a bit-rate which is close (e.g., within a predetermined distance) to an average bit-rate of the input video stream, can be selected. In some further embodiments, the selection criterion can include selecting one or more input segments representing or characterizing different scene types in the input video stream. For instance, if in the input video stream there are some input segments representing outdoor scenes and some other input segments representing indoor scenes, the selection can be performed such that representative segments of both outdoor and indoor scenes will be selected in order to provide good representation of the overall content of the input video stream.

Those versed in the art will readily appreciate that the examples illustrated with reference to the selection criterion of the representative segments are by no means inclusive of all possible alternatives but are intended to illustrate non-limiting examples, and accordingly other ways of selection of the representative segments can be used in addition to or in lieu of the above.

Following the selection of the representative segments, an encoding instruction can be determined (e.g., by the first video encoder configurator 108 illustrated in FIG. 1) and one or more encoded representative segments, encoded from the representative segments in accordance with the encoding instruction and using a quality-driven video encoding scheme, can be obtained (206).

According to certain embodiments, in cases where a first video encoder 110 encoding the representative segments in accordance with the encoding instruction is implemented in a standalone computer that is operatively connected with the system 100, the encoding instruction can be provided to the first video encoder 110 for encoding the representative segments using a quality-driven video encoding scheme, giving rise to one or more encoded representative segments.

According to certain embodiments, in cases where system 100 in FIG. 1 comprises the first video encoder 110, the step 206 of the method as illustrated in FIG. 2 can comprise encoding (e.g., instead of providing the encoding instruction to an external first video encoder such that the external first video encoder can perform the encoding) the representative segments in accordance with the encoding instruction using a quality-driven video encoding scheme, giving rise to the one or more encoded representative segments.

According to certain embodiments, the encoding instruction can include encoding, or instructing the first video encoder to encode the selected representative segments. In some embodiments, a quality-driven video encoding scheme can include encoding each video frame of the representative segments until a quality criterion is met by a corresponding encoded frame of the encoded representative segments. In cases where the input video stream is an encoded video bit-stream and each input segment thereof relates to a section of the encoded video bit-stream which corresponds to a plurality of encoded video frames, the encoded video bit-stream, or at least the sections that correspond to the representative segments, can be decoded (e.g., by a video decoder (not illustrated in FIG. 1)) first in order to obtain the corresponding decoded video frames, and the encoding by the first video encoder can then be performed on each decoded video frame of the representative segments. In such cases the encoding can also be understood or referred to as re-encoding since it is performed on a decoded format. Thus it is to be understood that the "video frame" used herein can refer to either an original video frame as comprised in an input video sequence, or a decoded video frame decoded from an encoded video bit-stream.

In some other embodiments, in cases where each input segment comprises one or more GOPs as aforementioned, the encoding according to quality-driven video encoding scheme can be performed at a GOP level instead of a frame level. For example, the quality-driven video encoding scheme can include encoding each GOP of the representative segments until a quality criterion is met by a corresponding encoded GOP of the encoded representative segments.

The term "quality criterion" is used herein to relate to a computable quality measure which provides an indication of video content quality. Such a quality measure receives as input a target image or video frame or a sequence of target video frames (e.g., the encoded frames of the encoded representative segments), and optionally also receives as input a corresponding reference image or video frame or a corresponding sequence of reference video frames (e.g., the video frames of the representative segments), and uses various quality metrics or quality measures to calculate a quality score for the target frame or target frame sequence. Good quality measures can provide quality scores that correlate well with subjective quality evaluation of the same content. Examples of quality measures that can be utilized herein include any of the following, or combinations thereof: Peak Signal to Noise Ratio (PSNR), Structural SIMilarity index (SSIM), Multi-Scale Structural SIMilarity index (MS-SSIM), Video Quality Metric (VQM), Visual information Fidelity (VIF), MOtion-based Video Integrity Evaluation (MOVIE), Perceptual Video Quality Measure (PVQM), quality measure using one or more of Added Artifactual Edges, texture distortion measure, and a combined quality measure combining inter-frame and intra-frame quality measures, such as described in U.S. patent application Ser. No. 14/342,209 entitled "Controlling a video content system" filed on Feb. 28, 2014, which is incorporated herein in its entirety by reference, as will be described in further detail below.

One example of a quality criterion which can be used in the encoding operation can be a perceptual quality measure. By way of example, a perceptual quality measure can be used to define a target (e.g., a minimal or a maximal) level of perceptual similarity. In other words, in such an example, the quality criterion can set forth a certain level of perceptual similarity, and the encoding operation can be configured to provide an encoded representative segment (or an encoded frame thereof) whose visual appearance, relative to the representative segment (or the input video frame thereof) that is used as input in the encoding operation, is above (or below) the target level of perceptual similarity. In one example the quality criterion can include a requirement that an encoded representative segment is perceptually identical (i.e., the quality measure score is above a certain value) to the corresponding representative segment which is provided as input of the encoding operation.

According to certain embodiments, the same quality criterion can be used for all representative segments of an input video stream. Alternatively, different quality criteria can be used for different representative segments. In the latter case, the quality criterion for a given representative segment can be manually set by an operator, or can be selected or computed, e.g., by the first video encoder configurator 108. By way of example, the quality criterion for a given segment can be determined according to a type classification of the segment, for instance according to the segment characteristics, such as level of motion, etc., or according to its location in the video stream. Further by way of example, a higher quality requirement can be used for the beginning of the video stream. Still further by way of example, different quality criteria can be used according to system level behavior, for instance indications that a segment is being viewed by many users and therefore should be encoded using a higher target quality.

By way of example, the encoding of the first video encoder can be performed using the Beamr Video encoder controller developed by Beamr Imaging Ltd. from Tel Aviv, Israel, as described in U.S. patent application Ser. No. 14/342,209 entitled "Controlling a video content system" filed on Feb. 28, 2014, which is incorporated herein in its entirety by reference. Further by way of example, the first video encoder can be any video encoder that supports a constant quality encoding mode, such as, e.g., x264 Constant Quality (CQ), or x264 Constant Rate Factor (CRF), followed by computing a quality measure to validate the quality of the encoded video stream.

Turning now to FIG. 3, there is shown a generalized flowchart of video encoding in accordance with a quality-driven video encoding scheme in accordance with certain embodiments of the presently disclosed subject matter.

According to certain embodiments, for each video frame of the representative segments, the video frame can be encoded (302) (e.g., by the first video encoder 110) with a compression parameter. By way of example, the compression parameter can be one or more of the following: a quantizer parameter ("QP"), bit-rate parameter, and a compression level indicating a preconfigured set of parameters in a given encoder. An initial compression parameter value to start the encoding process with, can be preset or can be computed or selected. For example, the initial compression parameter value can be manually selected by an operator of the first video encoder. In a further example, the initial compression parameter value can be computed or selected (e.g., by the first video encoder configurator 108, or a module within the first video encoder) according to a characteristic of a current video frame to be encoded, such as, e.g., frame resolution, pixel value energy or variance, Sum of Absolute Difference compared to a preceding video frame, etc., and/or according to a characteristic of a preceding video frame, and/or according to a characteristic of the input video sequence.

The following steps of 304-310 relate to a quality evaluation process for each encoded video frame. Specifically, a frame quality score can be computed (304) (e.g., by the first video encoder 110 or a quality evaluation module incorporated therein) for the encoded frame. According to certain embodiments, utilizing a combined quality measure combining inter-frame and intra-frame quality measures as aforementioned, the computation of the frame quality score can be based on an intra-frame quality score and an inter-frame quality score. By way of example, the intra-frame quality score can be computed using an intra-frame quality applied in the pixel-domain of the video frame and the encoded frame. The inter-frame quality score can be computed based on a first difference between the video frame and a preceding video frame, and a second difference between the encoded frame and a preceding encoded frame. The preceding encoded frame is the encoded frame which corresponds to the preceding frame.

According to certain embodiments, the intra-frame quality score can optionally be associated with one or more of the following intra-wise quality measures: an added artifactual edges measure, a texture distortion measure, a pixel-wise difference measure and an edge loss measure. By way of example, as part of the intra-frame quality score computation, an added artifactual edges measure can be implemented and an added artifactual edges score can be calculated. The added artifactual edges score can be calculated based on quantifying an extent of added artifactual edges along a video encoding coding block boundary of an encoded frame relative to an input video frame. In some cases, the extent of added artifactual edges can be determined according to a behavior of pixel values (e.g., a change of pixel values) across video coding block boundaries in relation to a behavior of pixel values on either side of respective video coding block boundaries.

By way of another example, as part of the intra-frame quality score computation, a texture distortion measure can be implemented and a texture distortion score can be calculated. The texture distortion measure can be based on relations between texture values in an encoded frame and in a corresponding input video frame. Each texture value may correspond to a variance of pixel values within each one of a plurality of predefined pixel groups in the encoded frame and in each respective pixel group in the corresponding input video frame.

By way of further example, as part of the intra-frame quality score computation, a pixel-wise difference measure can be implemented using a pixel-domain quality measure based on a pixel-wise difference between the video frame and the encoded frame.

By way of yet further example, as part of the intra-frame quality score computation, an edge loss measure can be implemented and an edge loss score can be calculated. For example, the edge loss score computation can include: obtaining an edge map corresponding to a video frame, computing for each edge pixel in the video frame an edge strength score based on a deviation between a value of an edge pixel and one or more pixels in the proximity of the edge pixel, computing for each corresponding pixel in the encoded frame an edge strength score based on a deviation between a value of the corresponding pixel and one or more pixels in the proximity of the corresponding pixel, and the edge loss score is calculated based on a relation among the edge strength score of the edge pixel and the edge strength score of the corresponding pixel.

According to certain embodiments, as part of the inter-frame quality score computation, the first difference value can be calculated based on a pixel-wise difference between an input video frame and a preceding input frame, and the second difference value can be calculated based on a pixel-wise difference between a current encoded frame and the preceding encoded frame. Then the inter-frame quality score can be computed based on a comparison of the first difference value and the second difference value, in order to evaluate a temporal consistency of the encoded frame.

Based on the computed intra-frame quality score and inter-frame quality score, an overall frame quality score for an input video frame can be computed. According to certain embodiments, such a combined quality measure can enable the first video encoder to provide a near maximal compression rate for a given video frame while maintaining the overall relative perceptual quality of the respective encoded frame at a level that meets a desired quality criterion.

It is to be noted that further details of the above mentioned different quality measures for computing the frame quality score, including the computation of the intra-frame and inter-frame quality scores, are described in U.S. patent application Ser. No. 14/342,209 entitled "Controlling a video content system" filed on Feb. 28, 2014, which is incorporated herein in its entirety by reference. It is also to be noted that the above described quality measures are by no means inclusive of all possible alternatives but are intended to illustrate non-limiting examples, and accordingly other quality measures can be used in addition to or in lieu of the above.

In case the quality criterion is not met (306) by the frame quality score, the compression parameter can be updated (308), and the encoding of the video frame (302) can be repeated with the updated compression parameter giving rise to an updated encoded frame. The computation of the frame quality score (304) for the updated encoded frame, including the computation of the inter-frame quality score and the intra-frame quality score, can be repeated. The updated encoded frame can be evaluated again until a frame quality score of a certain updated encoded frame meets (306) the quality criterion.

If the quality criterion is met (306) by the frame quality score of a current video frame, the encoding process as above described with reference to steps 302-308 can be repeated (310) with a next video frame until each video frame of the representative segments are encoded and each corresponding encoded frame meets the quality criterion. The encoded frames constitute the encoded representative segments.

It would be appreciated that in some cases the initial encoded frame can meet the quality criterion, and the encoding process for a given video frame can terminate with the initial compression parameter and the initial encoded frame.

According to certain embodiments, in cases where the quality-driven video encoding scheme is performed at a GOP level, the above described steps in FIG. 3 can be adapted accordingly. By way of example, for each GOP of the representative segments, each video frame within the GOP can be encoded with a compression parameter, and the corresponding encoded video frames can constitute an encoded GOP. A GOP quality score can be computed for the encoded GOP. For instance, the GOP quality score is computed based on at least one frame quality score calculated for at least one encoded frame within the encoded GOP. In cases where a quality criterion (e.g., in this case the quality criterion is a GOP level quality criterion) is not met by the GOP quality score, the encoding of each video frame within the GOP can be repeated with an updated compression parameter, giving rise to an updated encoded GOP. The computation of the GOP quality score can also be repeated for the updated encoded GOP, until a GOP quality score of the updated encoded GOP meets the quality criterion.

Referring back to FIG. 2 now, once the encoded representative segments are obtained, an encoding configuration can be determined (208) (e.g., by the second video encoder configurator 112 illustrated in FIG. 1), based on the encoded representative segments, and one or more encoded input segments encoded from at least a sub-set of the input segments using the encoding configuration can be obtained.

According to certain embodiments, in cases where a second video encoder 114 encoding the at least a sub-set of the input segments using the encoding configuration is implemented in a standalone computer that is operatively connected with the system 100, the encoding configuration can be provided to the second video encoder 114 for encoding at least a sub-set of the input segments, giving rise to one or more encoded input segments.

According to certain embodiments, in cases where system 100 in FIG. 1 comprises the second video encoder 114, the step 208 of the method as illustrated in FIG. 2 can comprise encoding (e.g., instead of providing the encoding configuration to an external second video encoder such that the external second video encoder can perform the encoding) at least a sub-set of the input segments in accordance with said encoding configuration, giving rise to the one or more encoded input segments.

According to certain embodiments, the encoding configuration can include setting a target bit-rate for encoding the entire input video stream or at least part thereof. In some cases, one of the considerations of finding a target bit-rate for the input video stream is that when using a good video encoder, some adaptation of resources allocation (e.g., actual bit-rate allocated to different parts of the video stream, such as, e.g., at a scene and frame level) is possible according to the complexity of their content. This is particularly relevant when the encoding of the representative segments is performed in a mode such as, e.g., Variable Bit-Rate (VBR). VBR relates to the bit-rate used in video encoding. As opposed to constant bit-rate (CBR), VBR encoded files vary the amount of output data per time segment. VBR allows a higher bit-rate (and therefore requires more storage space) to be allocated to the more complex segments of a video stream, while less space is allocated to less complex segments. The average of these rates can be calculated to produce an average bit-rate for the stream. Therefore, for many input video streams, knowing the right average target bit-rate for achieving a quality-driven encoding result which meets a target quality criterion (e.g., perceptually identical or equivalent) is a sufficient solution to configure and optimize the encoding of the entire input video stream, or at least part thereof. In such cases, the selection of a second video encoder can be flexible. By way of example, the second video encoder can be any off-the-shelf video encoder which can encode an input video stream in accordance with certain encoding configurations, e.g., in accordance with a target bit-rate. In some cases, the first video encoder can also be used as the second video encoder, without the necessity of performing the quality evaluation process for each frame, as described in steps 304-310.

According to certain embodiments, the encoding configuration provided to the second video encoder can include setting a target bit-rate for encoding at least a sub-set of the input segments of the input video stream based on an average bit-rate of the encoded representative segments. By way of example, the average bit-rate can be calculated based on the bit-consumption of each encoded frame of the encoded representative segments. In some cases, the sub-set of the input segments to be encoded can include a remaining set of input segments which are not included in the representative segments, i.e., the rest of the input segments which have not been encoded by the first video encoder. In some other cases, it is determined that the entire input video stream, i.e., all the input segments thereof including the representative segments and the rest, can be encoded in accordance with the encoding configuration. In yet further cases, it is possible to apply the encoding at a target bit-rate on a segment-wise basis, such as, e.g., to each segment independently. By way of example, each segment can be encoded independently to a target bit-rate based on bit-rates obtained for the representative segments. Optionally, the target bit-rate for encoding each segment can be different.

According to certain embodiments, the encoding configuration can include setting a target bit-rate for encoding at least a sub-set of the input segments based on a bit-rate of the input video stream and a relation between a bit-rate of the representative segments and a bit-rate of the corresponding encoded representative segments. Bit-rate used herein relates to the bit consumption (i.e. the number of bits that are conveyed or processed) over a pre-determined time unit. For illustration purposes only, there is given an example of an input video stream with an average bit-rate of 4 Mbps. Assume there are three representative segments selected with a bit-rate of 4.2 Mbps, 4.5 Mbps and 3.5 Mbps respectively. The corresponding encoded representative segments have bit-rates of 3.1 Mbps, 3.3 Mbps and 2.8 Mbps.

The corresponding reduction ratio (e.g., a ratio indicative of the bit-rate of the corresponding encoded segment as compared to the bit-rate of the representative segment) for each representative segment can be calculated and the target bit-rate for encoding the input video stream or part thereof can be set, e.g., according to the input bit-rate of 4 Mbps and an average reduction ratio derived from the reduction rates for each segment, since for a given video quality, the bit-rate of a video stream normally corresponds to the size of the video stream. In other words, the target bit-rate for encoding can be set based on a bit-rate of the input video stream and a relation between the size of the representative segments and the size of the corresponding encoded representative segments.

According to further embodiments, the encoding configuration can include setting a target bit-rate for encoding at least a sub-set of the input segments based on a bit-rate of the input video stream and a minimal reduction ratio. The minimal reduction ratio can be determined based on the encoded representative segments. For example, if the encoded representative segments, as compared to the original representative segments, show a reduction ratio that is less than a pre-determined percentage (e.g., 10%), the minimal reduction ratio in this case can be set as, e.g., 10%, and the target-bit-rate for encoding the input segments or part thereof can be set based on, e.g., the product of the bit-rate of the input video stream and the minimal reduction ratio. In some cases, a small reduction ratio of the encoded representative segments as compared to the representative segment normally indicates that the encoded segments may not show much compression saving. In such cases, to set the target bit-rate in accordance with a minimal reduction ratio, one can adapt or adjust the bit-rate or the size of encoded input segments to a level which results in a lower bit-rate than the target bit-rate which would normally be obtained from the representative segments. The quality of the encoded input segments will be evaluated by a quality evaluation process that follows in order to make sure the compression quality with such configured target bit-rate is still acceptable, as will be described in detail below.

According to certain embodiments, in addition or in lieu of setting a target bit-rate based on the bit-rate(s) of the encoded representative segments, further information acquired during the encoding of the representative segments (e.g., during quality evaluation performed as part of the quality driven encoding process) or information obtained from the resulting encoded representative segments can be used to configure one or more encoding properties for encoding the input video stream or part thereof. Such configuration of one or more encoding properties can also be included in the encoding configuration to be provided to the second video encoder. The acquired further information can include, but is not limited to the following: compression level or other compression parameters used for the encoding, nature of the content of the input video detected by way of, e.g., face detection, or animation content, brightness level, skin detection, presence of blockiness or any other quality-sensitive content detection during the encoding process, etc.

By way of example, if during encoding of the representative segments, it is realized the input video stream suffers from blockiness (e.g., block boundary artifacts), the encoding configuration can further include adapting an encoding parameter that configures an in-loop de-blocking filter used, e.g., within the second video encoder and/or as post-processing process. For instance, the encoding parameter can be adapted to apply a stronger in-loop de-blocking filter in order to improve the visual quality of the compressed video.

In some embodiments, a de-blocking filter relates to a video filter applied to decoded compressed video to improve visual quality by smoothing the sharp edges which can form between macroblocks when block coding techniques are used. This type of filter aims to improve the appearance of decoded frames. In-loop de-blocking filtering indicates that the in-loop effects of the filter are taken into account in reference macroblocks used for prediction, as known to people skilled in the art of video compression. When an input stream is encoded, the filter strength can be selected or adapted (e.g., by applying a stronger filter, as above mentioned), or the filter can be switched off entirely, based on the indication from the encoding process or the encoded segments.

According to certain embodiments, different encoding configurations can be determined for encoding respective input segments, e.g., segments representing different scenes or scene types. By way of example, if an input video stream consists of bright and dark scenes, and in the segment splitting process (104) the splitting is performed at locations indicative of scene changes, such that different input segments represent different scenes, thus each input segment, after splitting, can comprise video frames belonging either all to dark scenes, or all to bright scenes. Accordingly the representative segments can also be selected in order to represent both scene types. A different encoding configuration can be derived for each of these scene types, and can be provided for encoding the input segments corresponding to each scene type accordingly.

Once the encoded input segments are obtained, an evaluation instruction can be determined (210) to be used to evaluate quality for each encoded input segment. In cases where a quality evaluation module 118 evaluating quality for each encoded input segment is implemented in a standalone computer that is operatively connected with the system 100, the evaluation instruction can be provided (e.g., by the I/O interface 120 illustrated in FIG. 1) to a quality evaluation module (e.g., the quality evaluation module 118) to evaluate quality for each encoded input segment. The evaluation instruction can be determined (e.g., by the processor 103 or a quality evaluation controller (not illustrated in FIG. 1) of the processor 103) in order to be provided to the quality evaluation module. In some cases, the evaluation instruction can include instructing the quality evaluation module to evaluate each encoded input segment in accordance with a quality criterion. As described and exemplified above with reference to step 206 of FIG. 2 as well as FIG. 3, a quality criterion is used herein to relate to a computable quality measure which provides an indication of video content quality. One example of a quality criterion which can be used in the evaluation process is a perceptual quality measure. By way of example, the evaluation process can be configured to evaluate whether the visual appearance of an encoded input segment, relative to the corresponding input segment that is used as input in the evaluation process, is above (or below) a target level of perceptual similarity.

According to certain embodiments, in cases where system 100 in FIG. 1 comprises the quality evaluation module 118, the step 210 of the method as illustrated in FIG. 2 can comprise evaluating (e.g., instead of providing the evaluation instruction to an external quality evaluation module such that the external quality evaluation module can perform the evaluation) quality for each encoded input segment using the evaluation instruction.

Turning now to FIG. 4, there is shown a generalized flowchart of quality evaluation and a further encoding process in accordance with certain embodiments of the presently disclosed subject matter.

According to certain embodiments, a segment quality score can be computed (404) (e.g., by the quality evaluation module 118) for each encoded input segment, and it can be determined if a segment quality criterion is met (406) by the segment quality score. In some cases, the segment quality score can be computed based on at least one frame quality score which is calculated for at least one encoded frame within the encoded input segment. By way of example, the at least one encoded frame can be selected by sampling a certain percentage (e.g., n %) of the encoded frames within the encoded input segment. By way of another example, the at least one encoded frame can be selected as a number of representative frames from the encoded input segment in accordance with a given selection metric, such as, e.g., the content or the scene types of the frames, etc. In some other cases, the segment quality score can also be computed based on the frame quality score calculated for each encoded frame within the encoded input segment. The frame quality score computation can be performed in a similar manner as described with reference to step 304 in FIG. 3.

According to certain embodiments, a re-encoded version of an input segment corresponding to an encoded input segment that meets a predetermined condition can be obtained. In some embodiments, the second video encoder (either comprised in the processor 103 or implemented as a standalone computer) can be instructed (412) (e.g., by the quality evaluation module 118) to perform the re-encoding. In some embodiments, one example of such predetermined condition can include: a) the segment quality criterion is not met (406) by the segment quality score of an encoded input segment, which may indicate that the quality of the encoded input segment has been compromised by the encoding process, and b) the bit-rate of the encoded input segment is substantially reduced (408) compared to the bit-rate of the corresponding input segment, which may indicate that there is still further potential for the encoded segment to reach a higher saving or size reduction. By way of example, the bit-rate of the encoded input segment can be considered to be substantially reduced if the reduction ratio as compared to the bit-rate of the input segment reaches a certain predetermined threshold. In such conditions, a re-encoded version of the input segment can be obtained in accordance with a different encoding configuration. For instance, the second video encoder can be instructed to re-encode the corresponding input segment in accordance with a different encoding configuration. The different encoding configuration can include one of the following: re-encoding with a higher target bit-rate (e.g., higher than the target bit-rate previously set for the second video encoder), and re-encoding with the quality-driven video encoding scheme, as described above with reference to block 206 in FIG. 2.

In some cases, where the pre-determined condition is partially met, for example, if the segment quality criterion is not met, however the bit-rate of the encoded input segment is not substantially reduced compared to the bit-rate of the corresponding input segment, which may indicate that there is not much potential for the encoded segment to reach significant savings or size reduction, it will be determined that there is no need for further re-encoding and the process will continue with block 212, as will be described in further detail below.

In some embodiments, another example of such a predetermined condition can include: the segment quality score is substantially higher (410) than the segment quality criterion, which can indicate that the encoded segment may not be sufficiently compressed, and it may cause the size of the encoded or compressed segment to be unnecessarily too large. By way of example, the segment quality score can be considered to be substantially higher if it is higher than the criterion for a certain percentage. In such conditions, a re-encoded version of the input segment can be obtained in accordance with a different encoding configuration. For instance, the second video encoder can be instructed to re-encode the corresponding input segment in accordance with a different encoding configuration. The different encoding configuration can include one of the following: re-encoding with a lower target bit-rate (e.g., lower than the target bit-rate previously set for the second video encoder), and re-encoding with the quality-driven video encoding scheme, as described above with reference to block 206 in FIG. 2.

In some cases, where the pre-determined condition is not met, for example, if the segment quality criterion is met, however the segment quality score is not substantially higher than the segment quality criterion, which can indicate the quality of the encoded segment is in an acceptable range which does not compromise the size of the encoded segment, it will be determined that there is no need for further re-encoding and the process will continue with block 212, as will be described in further detail below.

According to certain embodiments, the re-encoded input segment can be re-evaluated in a similar way as above described with references to blocks 406-412. Specifically, by way of example, the re-encoding and re-evaluation operation can be repeated until one of below circumstances is met: a) when a certain re-encoded version of the corresponding input segment meets the segment quality criterion, and the segment quality score is not substantially higher than the criterion, or b) alternatively, when a certain re-encoded version of the corresponding input segment does not meet the segment quality criterion and the bit-rate of the re-encoded version is not substantially reduced. In such circumstances the method will proceed with the operation of output segment selection described with reference to block 212. In some embodiments, when the condition of above a) is met, the re-encoded version can be used as a candidate segment for the output segment selection in 212. When the condition of above b) is met, since the quality of the re-encoded version does not meet the segment quality criterion, such a re-encoded version will not be used as a candidate segment for the output segment selection, as will be described below in further detail.

It is to be noted that the re-encoding and re-evaluation operation can be either included as part of the quality evaluation process as described with reference to block 210, or alternatively, its functionality or at least part thereof, can be integrated or implemented as part of the process described within reference to block 212, as will be detailed below.

Turning back to FIG. 2, once the quality of each encoded input segment is evaluated and further encoding or re-encoding is optionally performed at least based on the evaluated quality for each encoded input segment, an output video stream can be generated (212) (e.g., by the Output video stream generator 116 illustrated in FIG. 1), by selecting, for each input segment, a corresponding output segment from a group comprising at least one of the following candidate segments: the input segment, an encoded representative segment of the input segment, and an encoded input segment of the input segment.

According to certain embodiments, in order to generate the output video stream, the "best" output segment can be selected for each input segment from a group of candidate segments in accordance with a selection criterion. In cases where the goal of the video encoding optimization is to maintain a target quality, such as, e.g., the output video stream being perceptually identical to the input, or to the preliminary encoded input stream when present, while minimizing the bit-rate or bit consumption of the output video stream, the selection criterion can be selecting a candidate segment with a lowest bit-rate from the group to be the corresponding output segment. In some embodiments, for each input segment, the group of the candidate segments comprises one or more of the following: the input segment itself, an encoded representative segment of the input segment when the input segment is selected as a representative segment, and an encoded input segment of the input segment when the input segment belongs to the sub-set of the input segments to be encoded by the second video encoder. In some embodiments, the encoded input segment can be one of the following: an encoded version of the input segment, and a re-encoded version of the input segment if the predetermined condition, as above described, is met. The re-encoded version can be generated either in accordance with the quality-driven video encoding scheme by the first video encoder, or alternatively it can be generated in accordance with the encoding configuration by the second video encoder. It is to be noted that when referring to the candidate segments as the encoded or re-encoded versions, the lowest bit-rate relates to the actual or resulting bit-rate of the candidate segments after encoding and re-encoding process, which is not necessarily the same as the target bit-rate that is set as in the encoding configuration. Optionally, when a preliminary encoding is performed on the input video stream, the group can further comprise an input segment derived from the preliminary encoded input stream (by e.g., splitting the preliminary encoded input stream to corresponding input segments). The selection of an output segment from all versions within the group can be implemented in a similar manner as described in PCT patent application No. PCT/IL2014/050723 entitled "Quality driven video-re-encoding" filed on Aug. 11, 2014, which is incorporated herein in its entirety by reference, as will be described in further detail below.

As aforementioned, the quality evaluation (optionally as well as the quality re-evaluation if any) process can assure that the candidate segments included in the group all fulfill the segment quality criterion, thus a selection of a candidate segments with the lowest bit-rate of all the versions to be the output segment can achieve the goal of maintaining a target quality while minimizing the bit consumption of the output video stream.

For exemplary purposes only and not to limit the disclosure in any way, there are illustrated a few examples of the output segment selection process. For instance, assume there are five input segments {S1, S2, S3, S4, S5} comprised in the input video stream, and the representative segments are selected as S1 and S3. After the encoding by the first video encoder, the encoded representative segments are R1 and R3 which correspond to the input segments of S1 and S3. In some cases, if it is determined that the input segments to be encoded by the second video encoder are S2, S4 and S5 (i.e., the rest of the segments which are not selected as the representatives), then the encoded input segments are respectively E2, E4 and E5. Assume the quality of E2, E4 and E5 all meet the segment quality criterion, thus the group of candidate segments for S1 will include {S1, R1} and the one out of the two versions with a lower bit-rate will be selected as the output segment for S1. Similarly, the group of candidate segments for S2 will include {S2, E2}, and the one out of the two versions with a lower bit-rate will be selected as the output segment for S2.

In further cases, if it is determined that the input segments to be encoded by the second video encoder are the entire input video stream (i.e., all the input segments S1-S5), then the encoded input segments are respectively E1, E2, E3, E4 and E5. Assume the quality of E1-E5 all meet the segment quality criterion, in such cases, the group of candidate segments for S1 will include {S1, R1, E1} and the one out of the three versions with a lower bit-rate will be selected as the output segment for S1. In yet further examples, assume the quality of E1 does not meet the segment quality criterion and the bit-rate thereof is not substantially reduced, E1 will not serve as a candidate segment for S1. Accordingly, the group of candidate segments for S1 will only include {S1, R1}. On the other hand, if the quality of E1 does not meet the segment quality criterion but the bit-rate thereof is substantially reduced, a re-encoded version RE1 (e.g., in accordance with a higher bit-rate) that meets the segment quality criterion can be obtained, and the group of candidate segments for S1 will accordingly include {S1, R1, RE1}.

According to certain embodiments, the selection criterion for selecting the output segment can be more complex. By way of example, selecting an output segment for an input segment can depend on a selection made for other input segments. For instance, if a current encoded input segment is only slightly smaller (e.g., in terms of bit-rate or size of the segment) than the corresponding input segment, and for the preceding input segment, the input segment itself was selected to be the output segment, then the output segment for the current input segment may be determined to be the current input segment as well.

It is to be noted that the video encoding optimization process as described with reference to blocks 202-212 in FIG. 2 is illustrated for exemplary purposes and there are certain special cases for which the process may not apply or partially apply.

For example, if in block 204 it is found that the set of input segments are very variable (e.g., in terms of content, such as scene types, or in terms of per segment bit-rate), and it is difficult to select a reliable sub-set of input segments as the representative segments, it may be decided to perform encoding of the entire input video stream (e.g., by the first video encoder) using a quality-driven video encoding scheme in block 206. The output video stream in this case can comprise, for each input segment, a corresponding encoded version using the quality-driven video encoding scheme, or alternatively the input segment where it is smaller than the encoded version.

In another example, if after the encoding of the representative segments in block 206, it is found that an estimated reduction ratio for the input video stream (which can be calculated e.g., based on the bit-rate of the encoded representative segments as compared to the bit-rate of the input video stream) while maintaining perceptual quality is very small, it may be determined not to proceed further with the following steps of 208-212 for this input video stream. The output video stream in this case can either comprise the input video stream as is, or alternatively it can comprise a combination of the encoded representative segments as the output segments for the representative segments, where they are smaller than the input segments, and the original input segments as the output segments for the rest of the input segments.

Those versed in the art will readily appreciate that the examples illustrated with reference to FIGS. 2-4 are by no means inclusive of all possible alternatives but are intended to illustrate non-limiting examples, and accordingly other ways of implementation can be used in addition to or in lieu of the above.

It is to be noted that the order and sequences of executing the processes as described with reference to FIGS. 2-4 are illustrated for exemplary purposes only and should not be construed to limit the present disclosure in any way. Certain stages illustrated in FIGS. 2-4 may be executed in a different order and/or one or more groups of stages may be executed simultaneously and vice versa.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a non-transitory computer-readable memory or storage medium tangibly embodying a program of instructions executable by the computer for executing the disclosed method.

The computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The invention claimed is:

1. A computerized method of segment-based video encoding optimization, the method comprising:

obtaining a set of input segments constituting an input video stream, each input segment corresponding to a plurality of video frames;

selecting one or more input segments from the set of input segments in accordance with a selection criterion, giving rise to one or more representative segments;

determining an encoding instruction and obtaining one or more encoded representative segments encoded from the representative segments in accordance with the encoding instruction and using a quality-driven video encoding scheme;

determining, based on the encoded representative segments, an encoding configuration, and obtaining one or more encoded input segments encoded from at least a sub-set of the input segments using the encoding configuration;

determining an evaluation instruction used to evaluate quality for each encoded input segment; and based on at least the evaluated quality for each encoded input segment, generating an output video stream, by selecting, for each input segment, a corresponding output segment from a group comprising at least one of the following candidate segments: the input segment, an encoded representative segment of the input segment, and an encoded input segment of the input segment.

2. The computerized method according to claim 1, further comprising splitting the input video stream into the set of input segments in accordance with a splitting criterion.

3. The computerized method according to claim 2, wherein the splitting criterion includes that each input segment other than a last input segment has a minimum segment length.

4. The computerized method according to claim 2, wherein the splitting criterion includes that said splitting is performed at locations within the input video stream such that decoding of each encoded input segment is conducted independently from one another.

5. The computerized method according to claim 2, wherein the splitting criterion includes that said splitting is performed in accordance with content of the input video stream.

6. The computerized method according to claim 5, wherein the splitting is performed at locations within the input video stream indicative of scene changes such that different input segments represent different scenes.

7. The computerized method according to claim 2, wherein the splitting is performed such that each input segment includes one or more of a Group Of Pictures (GOP).

8. The computerized method according to claim 1, wherein said selection criterion includes selecting a predetermined percentage of the input segments as the representative segments.

9. The computerized method according to claim 1, wherein said selection criterion includes selecting one or more input segments with a bit-rate that is representative of a bit-rate of the input video stream.

10. The computerized method according to claim 1, wherein said selection criterion includes selecting one or more input segments representing different scene types in the input video stream.

11. The computerized method according to claim 1, wherein said quality-driven video encoding scheme includes encoding each video frame of the representative segments until a quality criterion is met by a corresponding encoded frame of the encoded representative segments.

12. The computerized method according to claim 1, wherein said quality-driven video encoding scheme includes:

for each video frame of the representative segments,
encoding the video frame with a compression parameter;
computing a frame quality score for the encoded frame;
in case a quality criterion is not met by the frame quality score, repeating said encoding with an updated compression parameter giving rise to an updated encoded frame, and repeating said computing for the updated encoded frame, until a frame quality score of the updated encoded frame meets the quality criterion.

13. The computerized method according to claim 7, wherein said quality-driven video encoding scheme includes encoding each GOP of the representative segments until a quality criterion is met by a corresponding encoded GOP of the encoded representative segments.

14. The computerized method according to claim 13, wherein said quality-driven video encoding scheme includes:
for each GOP of the representative segments,
encoding each video frame within the GOP with a compression parameter, giving rise to an encoded GOP;
computing a GOP quality score for the encoded GOP;
in case the quality criterion is not met by the GOP quality score, repeating said encoding with an updated compression parameter giving rise to an updated encoded GOP, and repeating said computing for the updated encoded GOP, until a GOP quality score of the updated encoded GOP meets the quality criterion.

15. The computerized method according to claim 14, wherein the GOP quality score is computed based on at least one frame quality score calculated for at least one encoded frame within the encoded GOP.

16. The computerized method according to claim 12, wherein said computing includes computing a frame quality score based on an intra-frame quality score and an inter-frame quality score.

17. The computerized method according to claim 16, wherein said intra-frame quality score is computed using an intra-frame quality applied in the pixel-domain of the video frame and the encoded frame.

18. The computerized method according to claim 16, wherein said inter-frame quality score is computed based on a first difference between the video frame and a preceding video frame, and a second difference between the encoded frame and a preceding encoded frame.

19. The computerized according to claim 1, wherein said encoding configuration includes setting a target bit-rate for encoding at least a sub-set of the input segments based on an average bit-rate of the encoded representative segments.

20. The computerized method according to claim 1, wherein said encoding configuration includes setting a target bit-rate for encoding at least a sub-set of the input segments based on a bit-rate of the input video stream and a relation between a bit-rate of the representative segments and a bit-rate of the corresponding encoded representative segments.

21. The computerized method according to claim 1, wherein said encoding configuration includes setting a target bit-rate for encoding at least a sub-set of the input segments based on a bit-rate of the input video stream and a minimal reduction ratio, said minimal reduction ratio being determined based on the encoded representative segments.

22. The computerized method according to claim 19, wherein said encoding configuration further includes configuring one or more encoding properties based on information acquired during the encoding of the representative segments using the quality-driven video encoding scheme.

23. The computerized method according to claim 22, wherein said configuring one or more encoding properties includes adapting an encoding parameter that configures an in-loop de-blocking filter in case of the encoding of the representative segments indicating presence of blockiness in the input video stream.

24. The computerized method according to claim 1, wherein said sub-set of the input segments includes a remaining set of the input segments which are not included in the representative segments.

25. The computerized method according to claim 1, wherein said determining an encoding configuration includes determining different encoding configurations for encoding respective input segments representing different scenes.

26. The computerized method according to claim 1, wherein said quality is evaluated using a perceptual quality measure, including: computing a segment quality score for each encoded input segment, and determining if a segment quality criterion is met by the segment quality score.

27. The computerized method according to claim 26, wherein the segment quality score is computed based on at least one frame quality score calculated for at least one encoded frame within the encoded input segment.

28. The computerized method according to claim 26, further comprising obtaining a re-encoded version of an input segment corresponding to an encoded input segment that meets a predetermined condition.

29. The computerized method according to claim 28, wherein said predetermined condition includes: the segment quality criterion is not met by the segment quality score of an encoded input segment, and the bit-rate of the encoded input segment is substantially reduced compared to the bit-rate of the corresponding input segment; and wherein said re-encoded version of the input segment is obtained in accordance with a different encoding configuration including one of the following: re-encoding with a higher target bit-rate, and re-encoding with said quality-driven video encoding scheme.

30. The computerized method according to claim 28, wherein said predetermined condition includes: the segment quality score is substantially higher than the segment quality criterion; and wherein said re-encoded version of the input segment is obtained in accordance with a different encoding configuration including one of the following: re-encoding with a lower target bit-rate, and re-encoding with said quality-driven video encoding scheme.

31. The computerized method according to claim 1, wherein said selecting a corresponding output segment includes for each input segment, selecting a candidate segment with a lowest bit-rate from said group which meets a segment quality criterion, to be the corresponding output segment.

32. The computerized method according to claim 1, wherein said selecting a corresponding output segment for an input segment depends on a selection made for other input segments.

33. The computerized method according to claim 1, further comprising: performing a preliminary encoding of the input video stream in accordance with a predetermined bit-rate giving rise to a preliminary encoded input stream, and wherein said set of input segments are derived from said preliminary encoded input stream.

34. The computerized method according to claim 33, wherein the group further includes an input segment derived from said preliminary encoded input stream.

35. The computerized method according to claim 1, wherein said encoding relates to compression or re-compression.

36. The computerized method according to claim 1, further comprising encoding the representative segments in accordance with said encoding instruction using a quality-driven video encoding scheme, giving rise to the one or more encoded representative segments.

37. The computerized method according to claim 1, further comprising encoding at least a sub-set of the input segments in accordance with said encoding configuration, giving rise to the one or more encoded input segments.

38. The computerized method according to claim 1, further comprising evaluating quality for each encoded input segment in accordance with said evaluation instruction.

39. The computerized method according to claim 26, further comprising re-encoding an input segment corresponding to an encoded input segment that meets a predetermined condition.

40. The computerized method according to claim 1, wherein said input video stream comprises an input video bit-stream with each input segment thereof corresponding to a plurality of encoded video frames.

41. The computerized method according to claim 1, wherein said input video stream comprises an original input video sequence with each input segment thereof corresponding to a plurality of original video frames.

42. A computerized system of segment-based video encoding optimization, the system comprising:
  an I/O interface configured to:
    obtain a set of input segments constituting an input video stream, each input segment corresponding to a plurality of video frames;
  and a processing device comprising a processor and a memory operatively coupled thereto, the processing device configured to:
  select one or more input segments from the set of input segments in accordance with a selection criterion, giving rise to one or more representative segments;
  determine an encoding instruction and obtain one or more encoded representative segments encoded from the representative segments in accordance with the encoding instruction and using a quality-driven video encoding scheme;
  determine, based on the encoded representative segments, an encoding configuration and obtain one or more encoded input segments encoded from at least a sub-set of the input segments using the encoding configuration;
  determine an evaluation instruction used to evaluate quality for each encoded input segment; and
  based on at least the evaluated quality for each encoded input segment, generate an output video stream, by selecting, for each input segment, a corresponding output segment from a group comprising at least one of the following candidate segments: the input segment, an encoded representative segment of the input segment, and an encoded input segment of the input segment.

43. A non-transitory computer readable storage medium tangibly embodying a program of instructions executable by a processing device comprised in a computer to perform the method steps of claim 1.

* * * * *